(12) United States Patent
Jin et al.

(10) Patent No.: US 11,777,139 B2
(45) Date of Patent: Oct. 3, 2023

(54) GARNET-TYPE SOLID ELECTROLYTES WITH MODIFICATION LAYER, METHOD OF MAKING THEREOF, AND APPLICATION

(71) Applicants: Corning Incorporated, Corning, NY (US); Shanghai Institute of Ceramics, Chinese Academy of Sciences, Shanghai (CN)

(72) Inventors: Jun Jin, Shanghai (CN); Yadong Ruan, Shanghai (CN); Zhaoyin Wen, Shanghai (CN)

(73) Assignees: CORNING INCORPORATED, Corning, NY (US); Shanghai Institute of Ceramics Chinese Academy of Sciences, Shanghai (CN)

( * ) Notice: Subject to any disclaimer, the term of this patent is extended or adjusted under 35 U.S.C. 154(b) by 184 days.

(21) Appl. No.: 17/101,853

(22) Filed: Nov. 23, 2020

(65) Prior Publication Data
US 2022/0085405 A1    Mar. 17, 2022

(51) Int. Cl.
  *H01M 10/0562* (2010.01)
  *H01M 10/052* (2010.01)
  *C01G 35/00* (2006.01)
  *C01G 41/00* (2006.01)
  *C01G 25/00* (2006.01)

(52) U.S. Cl.
  CPC ...... *H01M 10/0562* (2013.01); *C01G 25/006* (2013.01); *C01G 35/006* (2013.01); *C01G 41/006* (2013.01); *H01M 10/052* (2013.01); *C01P 2002/30* (2013.01); *C01P 2004/03* (2013.01); *C01P 2006/16* (2013.01); *C01P 2006/40* (2013.01); *H01M 2300/0074* (2013.01); *H01M 2300/0094* (2013.01)

(58) Field of Classification Search
  CPC combination set(s) only.
  See application file for complete search history.

(56) References Cited

FOREIGN PATENT DOCUMENTS

CN    111384390 A  *  7/2020

OTHER PUBLICATIONS

Translation of CN 111384390A (Year: 2020).*

* cited by examiner

*Primary Examiner* — Daniel S Gatewood (57) ABSTRACT

A modified garnet-type solid electrolyte, includes: a garnet-type solid electrolyte; a modification layer, such that the modification layer is formed on at least one side of the garnet-type solid electrolyte, and possesses a three-dimensional crosslinking structure comprising at least one strongly acidic lithium salt and at least one weakly acidic lithium salt. A method of forming a modified garnet-type solid electrolyte, includes: exposing a garnet-type solid electrolyte in air to form a pre-passivation layer; mixing solutions of strong acid and weakly acidic salt to form a mixed solution; chemically treating at least one side of the garnet-type solid electrolyte with the mixed solution; and forming a modification layer on the at least one side of the garnet-type solid electrolyte.

18 Claims, 6 Drawing Sheets

GARNET-TYPE SOLID ELECTROLYTES WITH MODIFICATION LAYER, METHOD OF MAKING THEREOF, AND APPLICATION

This application claims the benefit of priority under 35 U.S.C. § 119 of Chinese Patent Application Serial No. 202010951937.2, filed on Sep. 11, 2020, the content of which is relied upon and incorporated herein by reference in its entirety.

BACKGROUND

1. Field

This disclosure relates to the field of solid-state lithium metal batteries, in particular to compositional and structural design of a surface modification layer of solid electrolyte and its preparation thereof.

2. Technical Background

Lithium ion batteries (LIBs) are widely used in 3C electronic products and electrified transportation. However, its further applications are impeded by its limited energy and power density. Due to high theoretical specific capacity (3860 mAh g$^{-1}$) and low reduction potential (−3.045 V vs standard hydrogen electrode) of lithium metal, using it to replace conventional graphite anode can effectively breakthrough the limitations in LIBs. Moreover, organic electrolytes used in traditional liquid LIBs are flammable and volatile. Parasitical reactions with the electrodes often cause internal thermal runaway and battery explosion; thus, it is necessary to introduce inflammable solid electrolyte to improve battery safety. Furthermore, solid electrolytes possess high density and good mechanical strength, making them promising for minimizing lithium dendrite growth. Overall, solid-state lithium metal batteries are a key direction of next-generation battery technology.

However, problems exist in solid-state lithium metal batteries, mainly concerning interfacial compatibility and lithium dendrite formation. Due to the solid nature and surface impurities of solid electrolytes, it is difficult to form uniform and continuous interfaces between solid electrolytes and lithium metal as the interfacial impedance is large and worsens when the battery cycles. Under high current density, lithium dendrites can be generated by uneven deposition of lithium ion and grow along surface defects or grain boundaries of the electrolyte, eventually leading to an internal short circuiting of the battery. Present strategies still result in formation of lithium dendrites at the electrolyte-Li anode interface and may be complex and costly to implement.

The present application discloses improved Li anode/garnet-type solid electrolyte interfaces and method of formation thereof for solid-state lithium metal battery applications.

SUMMARY

In some embodiments, a modified garnet-type solid electrolyte, comprises: a garnet-type solid electrolyte; a modification layer, wherein the modification layer: is formed on at least one side of the garnet-type solid electrolyte, and possesses a three-dimensional crosslinking structure comprising at least one strongly acidic lithium salt and at least one weakly acidic lithium salt.

In one aspect, which is combinable with any of the other aspects or embodiments, the strongly acidic lithium salt comprises at least one of lithium chloride, lithium perchlorate, lithium sulfate and lithium nitrate. In one aspect, which is combinable with any of the other aspects or embodiments, the weakly acidic lithium salt comprises at least one of lithium fluoride, lithium acetate, lithium phosphate, and lithium silicate. In one aspect, which is combinable with any of the other aspects or embodiments, according to the moles of the lithium ions contained, a ratio between the at least one strongly acidic lithium salt and the at least one weakly acidic lithium salt is in a range of 50:1 to 1:1.

In one aspect, which is combinable with any of the other aspects or embodiments, the garnet-type solid electrolyte comprises at least one of: (i) $Li_{7-3a}La_3Zr_2L_aO_{12}$, with L=Al, Ga or Fe and $0 \leq a \leq 7/3$; (ii) $Li_7La_{3-b}Zr_2M_bO_{12}$, with M=Bi, Ca, or Y and $0 \leq b<1$; (iii) $Li_{7-c}La_3(Zr_{2-c}, N_c)O_{12}$, with N=In, Si, Ge, Sn, V, W, Te, Nb, or Ta and $0 \leq c \leq 2$; (iv) $Li_xLa_3(Zr_{z-x}, M_x)O_{12}$, with M=In, Si, Ge, Sn, Sb, Sc, Ti, Hf, V, W, Te, Nb, Ta, Al, Ga, Fe, Bi, Y, Mg, Ca, or combinations thereof and $0<x<2$; and (v) $Li_{7-2d}La_3Zr_{2-d}N_dO_{12}$, with N=W or Mo and $0 \leq d \leq 2$, or combinations thereof. In one aspect, which is combinable with any of the other aspects or embodiments, the modification layer comprises a pore diameter ranging from 0.1 µm to 1 µm. In one aspect, which is combinable with any of the other aspects or embodiments, a thickness of the modification layer is in a range of 1 µm to 10 µm.

In some embodiments, a method of forming a modified garnet-type solid electrolyte, comprises: exposing a garnet-type solid electrolyte in air to form a pre-passivation layer; mixing solutions of strong acid and weakly acidic salt to form a mixed solution; chemically treating at least one side of the garnet-type solid electrolyte with the mixed solution; and forming a modification layer on the at least one side of the garnet-type solid electrolyte.

In one aspect, which is combinable with any of the other aspects or embodiments, the strong acid comprises at least one of hydrochloric acid, sulphuric acid, nitric acid and perchloric acid. In one aspect, which is combinable with any of the other aspects or embodiments, the weakly acidic salt comprises at least one of lithium fluoride, lithium carbonate, lithium acetate and lithium phosphate. In one aspect, which is combinable with any of the other aspects or embodiments, a molar concentration ratio of the strong acid to the weakly acidic salt is in a range of 1:1 to 20:1. In one aspect, which is combinable with any of the other aspects or embodiments, a total mass fraction of the strong acid and weakly acidic salt in the mixed solution is in a range of 1 wt % to 50 wt %. In one aspect, which is combinable with any of the other aspects or embodiments, an amount of the mixed solution added to the at least one side of the garnet-type solid electrolyte, per unit area, is in a range of 0.1 µL cm$^{-2}$ to 50 µL cm$^{-2}$. In one aspect, which is combinable with any of the other aspects or embodiments, the step of exposing the garnet-type solid electrolyte in air is conducted for a time in a range of 1 hour to 1000 hours.

In one aspect, which is combinable with any of the other aspects or embodiments, the step of mixing solutions of strong acid and weakly acidic salt is conducted in a solvent comprising at least one of water, ethanol and isopropanol. In one aspect, which is combinable with any of the other aspects or embodiments, the step of chemically treating at least one side of the garnet-type solid electrolyte with the mixed solution is conducted for a time in a range of 10 minutes to 1000 minutes. In one aspect, which is combinable with any of the other aspects or embodiments, the step of chemically treating at least one side of the garnet-type solid electrolyte with the mixed solution is conducted at a temperature in a range of 25° C. to 300° C.

In some embodiments, a solid-state lithium metal battery comprises the modified garnet-type solid electrolyte discloses herein.

BRIEF DESCRIPTION OF THE DRAWINGS

The disclosure will become more fully understood from the following detailed description, taken in conjunction with the accompanying figures, in which.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Definitions

"LLZO," "garnet," or like terms refer to compounds comprising lithium (Li), lanthanum (La), zirconium (Zr), and oxygen (O) elements. Optionally, dopant elements may substitute at least one of Li, La, or Zr.

For example, lithium-garnet electrolyte comprises at least one of: (i) $Li_{7-3a}La_3Zr_2L_aO_{12}$, with L=Al, Ga or Fe and $0 \le a \le 7/3$; (ii) $Li_7La_{3-b}Zr_2M_bO_{12}$, with M=Bi, Ca, or Y and $0 < b < 1$; (iii) $Li_{7-c}La_3(Zr_{2-c}, N_c)O_{12}$, with N=In, Si, Ge, Sn, V, W, Te, Nb, or Ta and $0 \le c \le 2$; (iv) $Li_{7-x}La_3(Zr_{2-x}, M_x)O_{12}$, with M=In, Si, Ge, Sn, Sb, Sc, Ti, Hf, V, W, Te, Nb, Ta, Al, Ga, Fe, Bi, Y, Mg, Ca, or combinations thereof and $0 \le x \le 2$; (v) $Li_{7.2d}La_3Zr_{2-d}N_dO_{12}$, with N=W or Mo and $0 \le d \le 2$, or a combination thereof.

"Include," "includes," or like terms means encompassing but not limited to, that is, inclusive and not exclusive.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

For example, in modifying the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, "about" or similar terms refer to variations in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" (or similar terms) also encompasses amounts that differ due to aging of a composition or formulation with a particular initial concentration or mixture and amounts that differ due to mixing or processing a composition or formulation with a particular initial concentration or mixture.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

As used herein, "room temperature" or "RT" is intended to mean a temperature in a range of about 18° C. to 25° C.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Abbreviations, which are well known to one of ordinary skill in the art, may be used (e.g., "h" or "hrs" for hour or hours, "g" or "gm" for gram(s), "mL" for milliliters, and "RT" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions, articles, and methods of the disclosure can include any value or any combination of the values, specific values, more specific values, and preferred values described herein, including explicit or implicit intermediate values and ranges.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Specific Implementation Mode

Garnet is a promising solid electrolyte material for Li-metal battery technology. Li metal anodes allow a much higher energy density than the carbon anodes currently used in conventional Li-ion batteries. Challenges exist in methods of making thin garnet materials. For example, one challenge is Li-dendrite formation, as explained above. A second challenge is the strength requirement for thin membranes, which is determined by battery assembly handling. A fine grain microstructure is desired for high strength.

The present disclosure relates to a method for constructing a modification layer on a garnet-type solid electrolyte and its application thereof. The construction method is first pre-passivating the surface of garnet solid electrolyte in air, and then treating the pre-passivation layer with acid-salt mixed solution. By adjusting the acid-salt ratio, treatment time and temperature, the modification layer can form a three-dimensional crosslinking structure. Such modification layer can increase the contact area between the electrolyte and the electrode and improve the interfacial compatibility. At the same time, the composition of the modification layer can also be tuned to block the electrons through the interface and further inhibit the nucleation and growth of lithium dendrite in the electrolyte. In addition, matched with the cathode, the solid-state lithium full cell with this modification layer is also assembled. Due to the special structure and outstanding properties of the modification layer, the overall performance of the full cell is excellent.

Specifically, one embodiment of the disclosure comprises an acid-salt treatment process. By controlling the type and concentration ratio of acid-salt, treatment time and solvent evaporation rate, the preparation of a three-dimensional crosslinking modified layer is realized, thereby the assembled solid-state lithium battery can deliver an excellent performance.

The garnet-type solid electrolyte used herein is LLZO, as defined above. First, the garnet-type solid electrolyte was exposed in air for a period of time, to form a pre-passivation layer. The process can be carried out at room temperature, and the passivation time can be controlled in a range of 1 hour to 1000 hours (e.g., 24 hours to 72 hours).

An acid-salt mixed solution is then prepared as a chemical treatment solution by mixing a strong acid and a weakly acidic Li salt. The strong acid may comprise at least one of hydrochloric acid, sulphuric acid, nitric acid and perchloric acid. The weakly acidic salt may comprise at least one of lithium fluoride, lithium carbonate, lithium acetate and lithium phosphate. The solvent is selected from at least one of water, ethanol and isopropanol. In the mixed solution, the molar ratio of acid (strong acid) to salt (weakly acidic salt) is in a range of 1:1 to 20:1 (e.g., 4:1 to 6:1). If the proportion of strong acid is too high, the solution will be too acidic and the porous structure of the modified layer cannot be realized. If the proportion of strong acid is too low, the passivation layer on the surface cannot be removed completely, and the affinity between the modified layer and lithium anode will be poor. In addition, the total mass fraction of the strong acid and weakly acidic salt in the mixed solution is in a range of 1 wt % to 50 wt %, preferably 5 wt % to 20 wt %.

Finally, the solid electrolyte is chemically treated with the abovementioned mixed solution. In one example, the acid-salt mixed solution is applied to one side surface of the solid electrolyte. In another example, the acid-salt mixed solution is applied to both sides of the solid electrolyte. The addition amount of the mixed solution per unit area is in a range of 0.1 μL cm$^{-2}$ to 50 μL cm$^{-2}$ (e.g, 10 μL cm$^{-2}$ to 15 μL cm$^{-2}$). The chemical treatment time is in a range of 10 minutes to 1000 minutes (e.g., 30 minutes to 120 minutes). The chemical treatment temperature is in a range of 25° C. to 300° C. (e.g., 50° C. to 80° C.).

A general experimental process and operation for the provided examples below is as follows:

a) The as-sintered garnet-type solid electrolyte ceramic pellet is placed in air for 1 hour~1000 hours to form a pre-passivation layer;

b) Preparing acid-salt solution: The solutions of strong acid and weakly acidic salt are mixed with a molar ratio of 1:1~20:1. Subsequently, a certain amount of solvent is added to control the total mass fraction of the acid and salt in a range of 1 wt % ~50 wt %.

c) Acid-salt treatment: The solution obtained in step b) is slowly and evenly added to the solid electrolyte of step a), with the addition amount per unit area of 0.1 μL cm$^{-2}$ to 50 μL cm$^{-2}$, the treatment time in a range of 10 minutes to 1000 minutes, the temperature of 25° C. to 300° C. The pellet is then washed with the solvent three times, and dried in an oven at 60° C. for 12 hours;

d) Lithium-molten process: the electrolyte pellet treated in step c) is transferred into a glovebox filled with argon (the content of water and oxygen is less than 0.1 ppm). Then lithium metal or lithium alloy is attached on one side of the pellet, and heated to 180~300° C. to ensure the good contact of lithium and the electrolyte;

e) All solid-state lithium symmetric cell is assembled after steps c) and d) are carried out on both sides of the solid electrolyte.
f) Matched with the cathode and adding a specific amount of traditional lithium-ion liquid electrolyte in cathodic side, the solid-state lithium full cell is assembled.

The present disclosure is further described by examples and the comparative samples in combination with the accompanying figures. However, the claimed invention should not be limited to the scope of embodiments and the comparative samples. In addition, types of solid electrolyte, types and concentration ratios of the acid and salt, amount of solution added, chemical reaction time, and temperature of lithium-molten process in the following examples are only illustrative.

EXAMPLES

Example 1

The specific experimental processes are as follows:
a) The as-sintered garnet-type solid electrolyte $Li_{6.5}La_3Zr_{1.5}Ta_{0.5}O_{12}$ ceramic pellet is placed in air for 72 hours to form a pre-passivation layer;
b) Preparing acid-salt solution: Hydrochloric acid and LiF are mixed with a molar ratio Cl:F of 5:1. Subsequently, a certain amount of water is added to control that the total mass fraction of the acid and salt is 8 wt %;
c) Acid-salt treatment: The solution obtained in step b) is slowly and evenly added to the solid electrolyte of step a) with the addition amount per unit area of 6.5 μL cm$^{-2}$ for 30 minutes staying at 60° C. The pellet is then washed with ethanol three times, and dried in an oven at 60° C. for 12 hours;
d) Lithium-molten process: The electrolyte pellet treated in step c) is transferred into a glovebox filled with argon (the content of water and oxygen is less than 0.1 ppm). Then lithium metal or lithium alloy is attached on one side of the pellet, and heated to 250° C. to ensure the good contact of lithium and the electrolyte;
e) All solid-state lithium symmetric cell is assembled after steps c) and d) are carried out on both sides of the solid electrolyte.

Figure 1A:
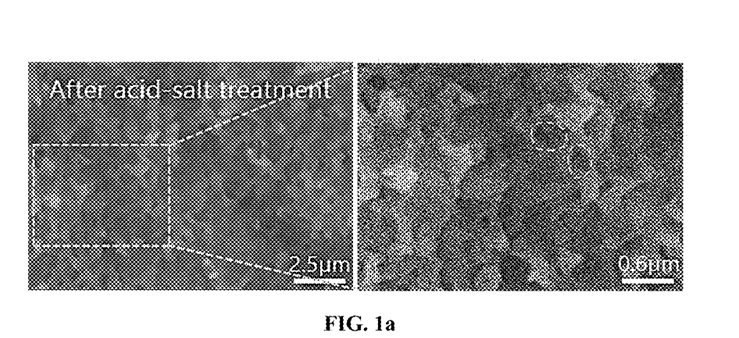
FIG. 1a shows the SEM images of the surface of solid electrolyte with high magnifications after acid-salt treatment in example 1.
Figure 1B:
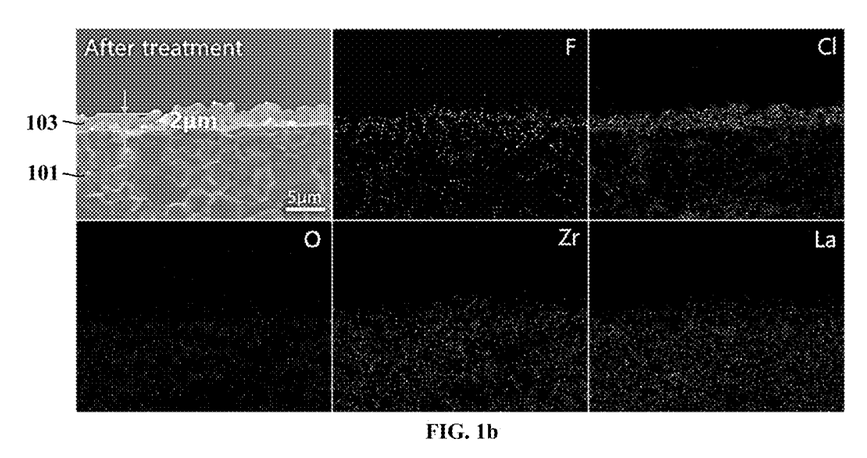
FIG. 1b shows the cross sectional SEM images and the corresponding elemental distributions of the solid electrolyte after acid-salt treatment in example 1.
Figure 1C:
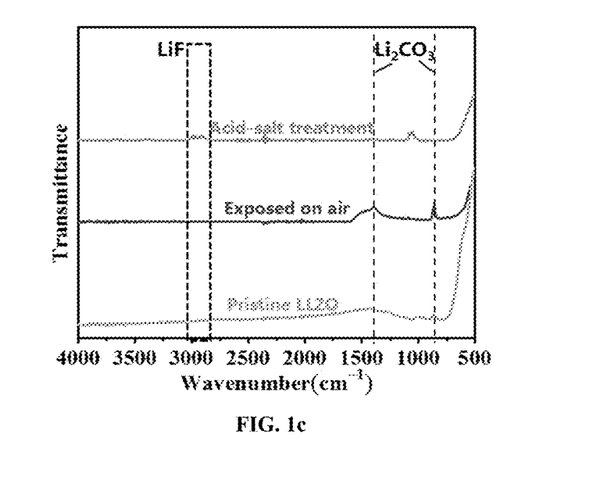
FIG. 1c shows ATR-FTIR spectra of solid electrolyte before and after acid-salt treatment in example 1.
Figure 1D:
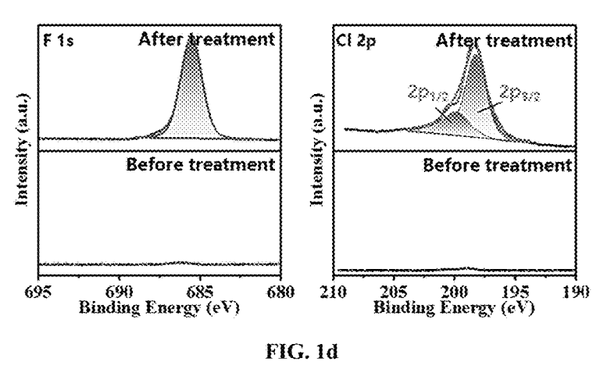
FIG. 1d shows the XPS spectra of the surface of solid electrolyte before and after acid-salt treatment in example 1.
Figure 1E:
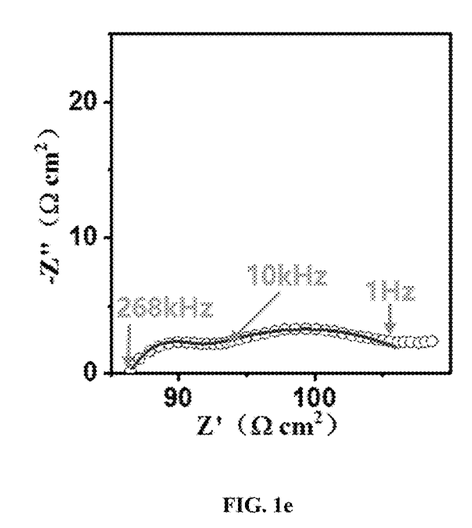
FIG. 1e shows the electrochemical impedance spectroscopy of the all-solid-state lithium symmetric cell containing the modification layer in example 1.
Figure 1F:
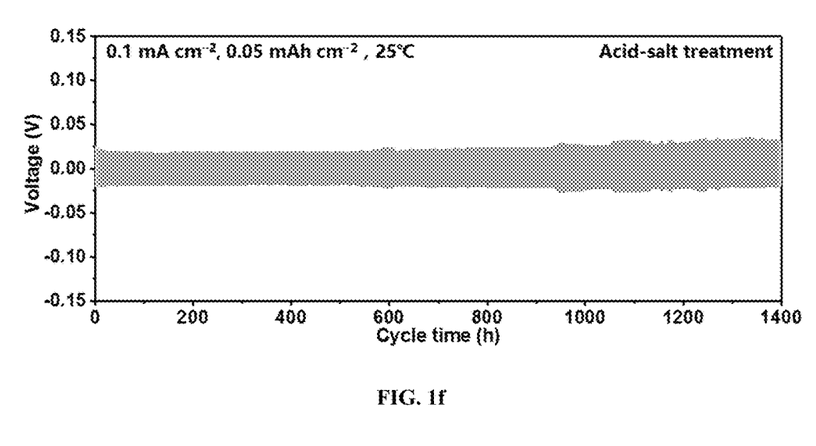
FIG. 1f shows the galvanostatic cycling performance of the all-solid-state lithium symmetric cell containing the modification layer in example 1.

The solid electrolyte before and after acid-salt treatment was characterized by SEM and ATR-FTIR, as shown in FIG. 1a-1c. FIG. 1a shows the SEM images after acid-salt treatment. It is found that the surface of the solid electrolyte (e.g., garnet solid electrolyte 101) is smoother after treatment. The magnified image shows that the surface modification layer 103 presents a uniform three-dimensional cross-linking porous structure with pore size of 0.3~0.5 μm, and the thickness of the modification layer 103 is 2 μm through the cross sectional SEM (as shown in FIG. 1b). ATR-FTIR (total reflection Fourier transform infrared spectroscopy, FIG. 1c) test shows that the solid electrolyte exposed to air produced a carbonate passivation layer and would be converted into lithium fluoride and lithium chloride after acid-salt treatment. As shown in FIG. 1d, the XPS data of the modified solid electrolyte also confirm the presence of lithium chloride and lithium fluoride after treatment. Besides, according to the raw materials added, the molar ratio of lithium chloride to lithium fluoride is 5:1. Electrochemical impedance spectroscopy (EIS) of the assembled all-solid-state lithium symmetric cell was further measured in a frequency range from 1 MHz to 0.1 Hz by potentiostatic method at 25° C. The results are shown in FIG. 1e. The interfacial impedance of the cell is small, less than 20 Ω cm$^2$. Meanwhile, the galvanostatic cycling test was also carried out at 25° C. at a current density of 0.1 mA cm$^{-2}$. The time of single charging or discharging is 30 minutes. After that, the cell was repeatedly cycled under the same conditions. As shown in FIG. 1f, the voltage remains stable for 1400 hours, implying that the cell operated well without short circuit.

Example 2

Figure 2:
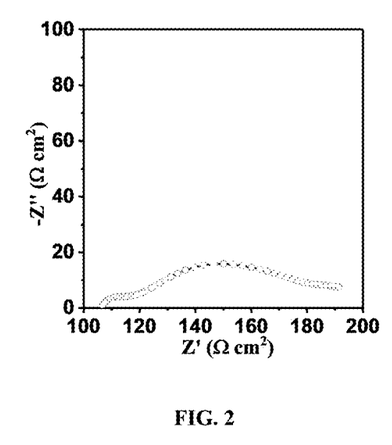
FIG. 2 shows the electrochemical impedance spectroscopy of the all-solid-state lithium symmetric cell containing the modification layer in example 2.

The specific experimental processes are as follows:
a) The as-sintered garnet-type solid electrolyte $Li_{6.5}La_3Zr_{1.5}Ta_{0.5}O_{12}$ ceramic pellet is placed in air for 48 hours to form a pre-passivation layer;
b) Preparing acid-salt solution: Hydrochloric acid and LiF are mixed with a molar ratio Cl:F of 10:1. Subsequently, a certain amount of water is added to control that the total mass fraction of the acid and salt is 8 wt %;
c)-e) The same process as the step c)-e) in Example 1.
Cell performance evaluation:
The EIS of the assembled all-solid-state lithium symmetric cell was measured in a frequency range from 1 MHz to 0.1 Hz by potentiostatic method at 25° C. The result is shown in FIG. 2. The interfacial impedance of the cell is less than 80 Ω cm$^2$.

Example 3

Figure 3:
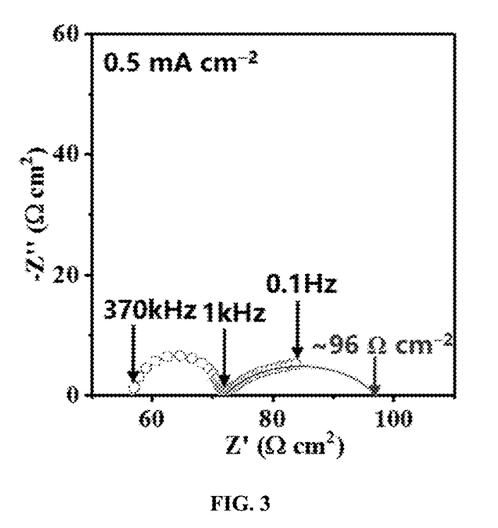
FIG. 3 shows the electrochemical impedance spectroscopy of the all-solid-state lithium symmetric cell containing the modification layer in example 3.

The specific experimental processes are as follows:
a) The as-sintered garnet-type solid electrolyte $Li_{6.5}La_3Zr_{1.5}Ta_{0.5}O_{12}$ ceramic pellet is placed in air for 48 hours to form a pre-passivation layer;
b) Preparing acid-salt solution: Hydrochloric acid and LiF are mixed with a molar ratio Cl:F of 5:1. Subsequently, a certain amount of water is added to control that the total mass fraction of the acid and salt is 8 wt %;
c) Acid-salt treatment: The solution obtained in step b) is slowly and evenly added to the solid electrolyte of step a) with the addition amount per unit area of 10 μL cm$^{-2}$ for 60 minutes staying at 60° C. The pellet is then washed with ethanol three times, and dried in an oven at 60° C. for 12 hours;
d)-e) The same process as the step d)-e) in Example 1.
Cell Performance Evaluation:
The EIS of the assembled all-solid-state lithium symmetric cell was measured in a frequency range from 1 MHz to 0.1 Hz by potentiostatic method at 25° C. The result is shown in FIG. 3. The interfacial impedance of the cell is less than 40 Ω cm$^2$.

Example 4

Figure 4:
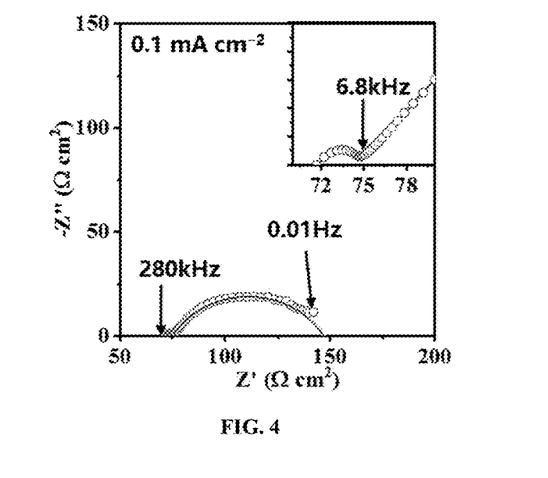
FIG. 4 shows the electrochemical impedance spectroscopy of the all-solid-state lithium symmetric cell containing the modification layer in example 4.

The specific experimental processes are as follows:
a)-b) The same process as the step a)-b) in Example 3.
c) Acid-salt treatment: The solution obtained in step b) is slowly and evenly added to the solid electrolyte of step a) with the addition amount per unit area of 6.5 μL cm$^{-2}$ for 30 minutes staying at 100° C. The pellet is then washed with ethanol three times, and dried in an oven at 60° C. for 12 hours;
d)-e) The same process as the step d)-e) in Example 1.
Cell performance evaluation:
The EIS of the assembled all-solid-state lithium symmetric cell was measured in a frequency range from 1 MHz to 0.1 Hz by potentiostatic method at 25° C. The result is shown in FIG. 4. The interfacial impedance of the cell is less than 80 Ω cm$^2$.

Example 5

The specific experimental processes are as follows:
a)-c) The same process as the step a)-c) in Example 1.
d) Lithium-molten process: the electrolyte pellet treated in step c) is transferred into a glovebox filled with argon (the content of water and oxygen is less than 0.1 ppm). Then lithium metal or lithium alloy is attached on one side of the pellet, and heated to 200° C. to ensure the good contact of lithium and the electrolyte;
e) Matched with the $LiFePO_4$ cathode and adding 10 μL traditional lithium-ion liquid electrolyte in cathodic side, the solid-state lithium full cell is assembled. The liquid electrolyte comprises 1 M $LiPF_6$ in a solvent mixture of ethylene carbonate and dimethyl carbonate by volume ratio of 1:1). $LiFePO_4$ cathode is fabricated by the slurry pasting method. $LiFePO_4$ powder, conductive carbon and binder first are mixed in N-methylpyrrolidone with a mass ratio of 8:1:1, and then ball-milled for 6 hours at 250 rpm. The obtained slurry is coated on the aluminum foil, dried in vacuum, and finally cut into a disc with a diameter of 12 mm, which is the $LiFePO_4$ cathode.

Figure 5A:
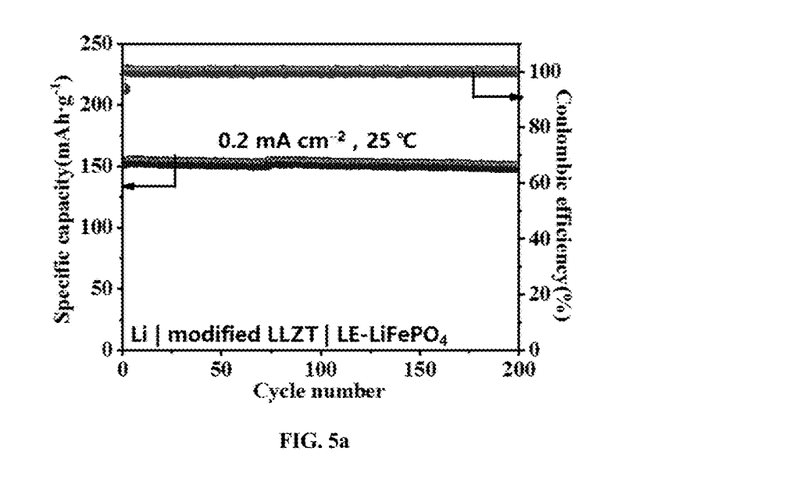
FIG. 5a shows the galvanostatic charging/discharging performance of the solid-state lithium metal battery with $LiFePO_4$ as the cathode in example 5.
Figure 5B:
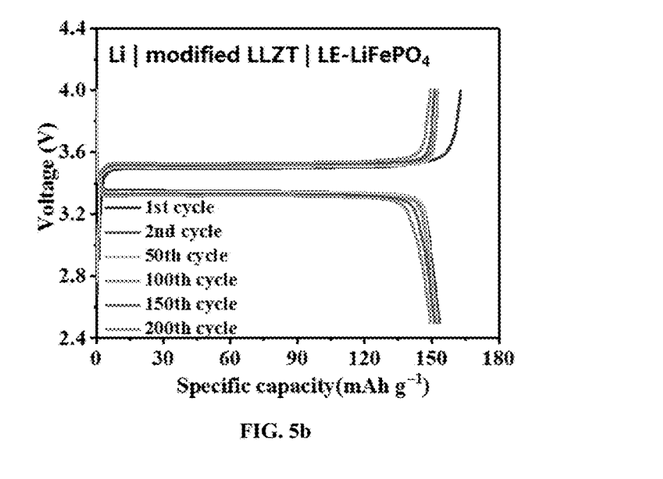
FIG. 5b shows the voltage profiles of the solid-state lithium metal battery with $LiFePO_4$ as the cathode in example 5.

Cell performance evaluation:

The cell was galvanostatically charged and then discharged at 25° C. with a cut-off voltage of 2.54~4.0 V and a current density of 0.2 mA $cm^{-2}$. After that, the cell was repeatedly cycled under the same conditions. The results are shown in FIGS. 5a and 5b. FIG. 5a shows that the cell has a stable cycle for more than 200 cycles, and the discharge capacity maintains 150 mAh $g^{-1}$. FIG. 5b shows the voltage profiles of the cell, which also remains stable during the cycle with a small voltage polarization.

Example 6

The specific experimental processes are as follows:
a)-d) The same process as the step a)-d) in Example 1.
e) Matched with the $LiNi_{0.5}Co_{0.2}Mn_{0.3}O_2$ (NCM523) cathode and adding 10 μL traditional lithium-ion liquid electrolyte in cathodic side, the solid-state lithium full cell is assembled. The liquid electrolyte comprises 1 M $LiPF_6$ in a solvent mixture of ethylene carbonate and dimethyl carbonate by volume ratio of 1:1). $LiNi_{0.5}Co_{0.2}Mn_{0.3}O_2$ cathode is fabricated by the slurry pasting method. $LiNi_{0.5}Co_{0.2}Mn_{0.3}O_2$ powder, conductive carbon and binder first are mixed in N-methylpyrrolidone with a mass ratio of 8:1:1, and then ball-milled for 6 hours at 250 rpm. The obtained slurry is coated on the aluminum foil, dried in vacuum, and finally cut into a disc with a diameter of 12 mm, which is the $LiNi_{0.5}Co_{0.2}Mn_{0.3}O_2$ cathode.

Figure 6:
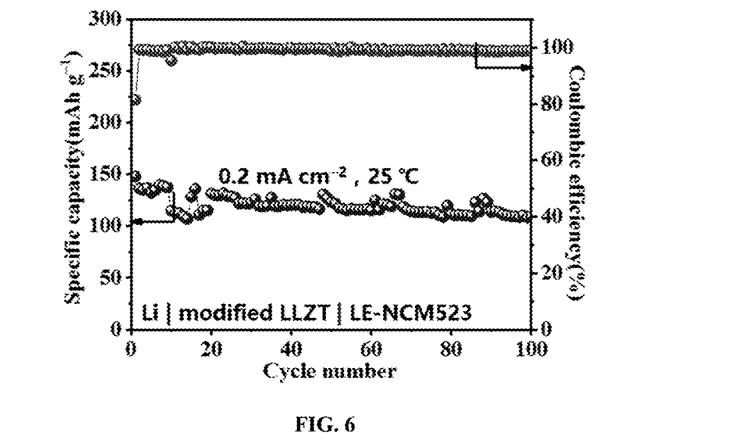
FIG. 6 shows the galvanostatic charging/discharging performance of the solid-state lithium metal battery with $LiNi_{0.5}Co_{0.2}Mn_{0.3}O_2$ as the cathode in example 6.

Cell performance evaluation:

The cell was galvanostatically charged and then discharged at 25° C. with a cut-off voltage of 2.8~4.3 V and a current density of 0.2 mA $cm^{-2}$. After that, the cell was repeatedly cycled under the same conditions. The results are shown in FIG. 6. The cell operates well for more than 100 cycles, although the discharge capacity has a fluctuation.

Example 7

The specific experimental processes are as follows:
a) The as-sintered garnet-type solid electrolyte $Li_{6.6}La_3Zr_{1.8}W_{0.2}O_{12}$ ceramic pellet is placed in air for 48 hours to form a pre-passivation layer;
b)-e) The same process as the step b)-e) in Example 1.

Example 8

The specific experimental processes are as follows:
a) The as-sintered garnet-type solid electrolyte $Li_{6.4}Ga_{0.2}La_3Zr_2O_{12}$ ceramic pellet is placed in air for 48 hours to form a pre-passivation layer;
b)-e) The same process as the step b)-e) in Example 1.

Example 9

The specific experimental processes are as follows:
a) The same process as the step a) in Example 1.
b) Preparing acid-salt solution: Hydrochloric acid and LiF are mixed with a molar ratio Cl:F of 5:1. Subsequently, a certain amount of water is added to control that the total mass fraction of the acid and salt is 20 wt %;
c)-e) The same process as the step c)-e) in Example 1.

Comparative Sample 1

The specific experimental processes are as follows:
(a) Both sides of the as-sintered $Li_{6.5}La_3Zr_{1.5}Ta_{0.5}O_{12}$ ceramic pellet are polished with 400 mesh sandpaper to remove the impurity layer;
(b) Lithium-molten process: the electrolyte pellet obtained in step a) is transferred into a glovebox filled with argon (the content of water and oxygen is less than 0.1 ppm). Then lithium metal or lithium alloy is attached on one side of the pellet, heated to 250° C. and cooled naturally;
(c) All solid-state lithium symmetric cell is assembled after steps b) are carried out on both sides of the solid electrolyte.

Figure 7A:
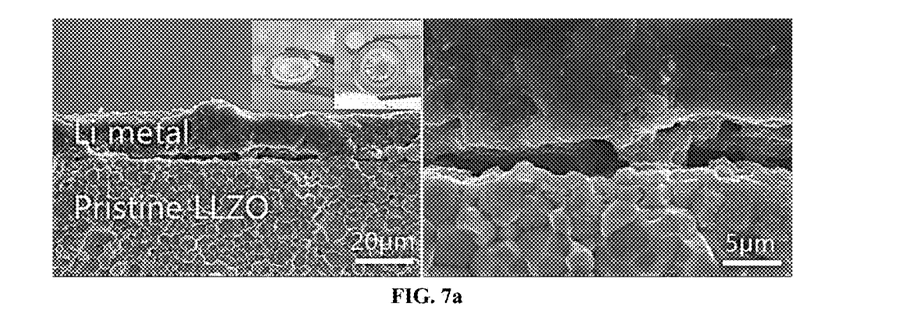
FIG. 7a shows the cross-sectional SEM images of the solid electrolyte/lithium interface without acid-salt treatment in Comparative Sample 1.
Figure 7B:
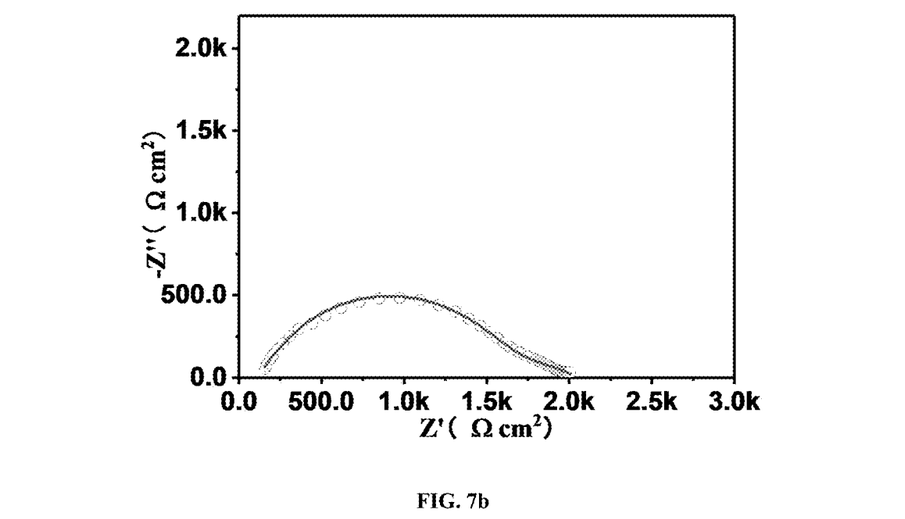
FIG. 7b shows the electrochemical impedance spectroscopy of the all-solid-state lithium symmetric cell without a modification layer in Comparative Sample 1.
Figure 7C:
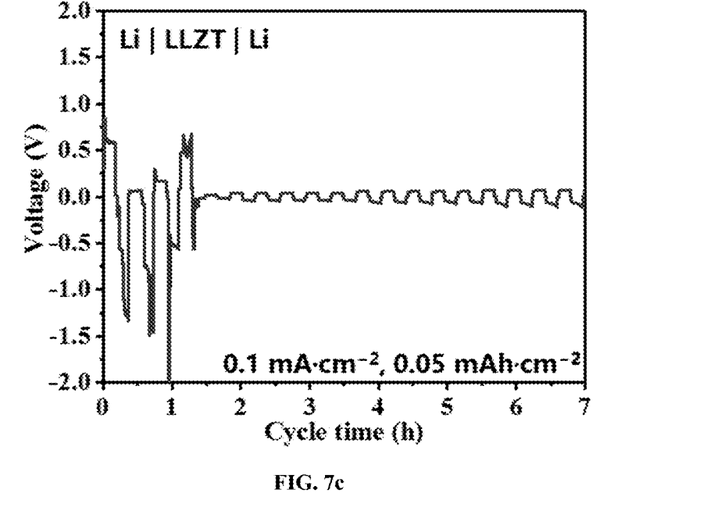
FIG. 7c shows the galvanostatic cycling performance of the solid-state lithium metal battery without a modification layer in Comparative Sample 1.

The solid electrolyte/lithium interface was observed by SEM, and the results are shown in FIG. 7a. It can be seen that the interface without acid-salt treatment has poor contact and presents a micron-level gap. The EIS of the assembled all-solid-state lithium symmetric cell was measured in a frequency range from 1 MHz to 0.1 Hz by potentiostatic method at 25° C. The result is shown in FIG. 7b. The interfacial impedance of the cell is as high as 2000 Ω $cm^2$. Meanwhile, the galvanostatic cycling test was also carried out at 25° C. at a current density of 0.1 mA $cm^{-2}$. The time of single charging or discharging is 30 minutes. After that, the cell was repeatedly cycled under the same conditions. The results are shown in FIG. 7c. At the beginning, the voltage polarization of the cell is large, and with the increase of the cycle, the cell finally generates short circuit.

Comparative Sample 2

The specific experimental processes are as follows:
a) The as-sintered garnet-type solid electrolyte $Li_{6.5}La_3Zr_{1.5}Ta_{0.5}O_{12}$ ceramic pellet is placed in air for 48 hours to form a pre-passivation layer;
b) Preparing acid solution: Hydrochloric acid is diluted by adding a certain amount of water to control that the mass fraction of the acid is 8 wt %;
c) Acid treatment: The solution obtained in step b) is slowly and evenly added to the solid electrolyte of step a) with the addition amount per unit area of 6.5 μL $cm^{-2}$ for 30 minutes staying at 60° C. The pellet is then washed with ethanol three times, and dried in an oven at 60° C. for 12 hours;
d) Lithium-molten process: The electrolyte pellet treated in step c) is transferred into a glovebox filled with argon (the content of water and oxygen is less than 0.1 ppm). Then lithium metal or lithium alloy is attached on one side of the pellet, and heated to 250° C. to ensure the good contact of lithium and the electrolyte;

e) All solid-state lithium symmetric cell is assembled after steps c) and d) are carried out on both sides of the solid electrolyte.

Figure 8A:
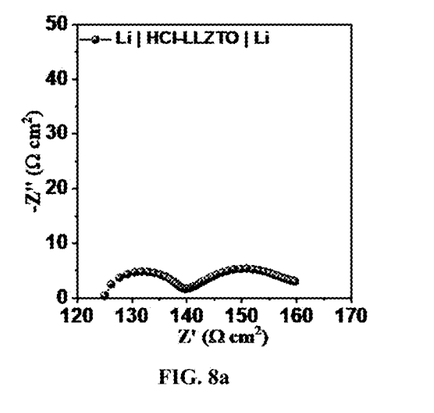
FIG. 8a shows the electrochemical impedance spectroscopy of the solid-state lithium metal battery containing a modified solid electrolyte only treated with hydrochloric acid in Comparative Sample 2.
Figure 8B:
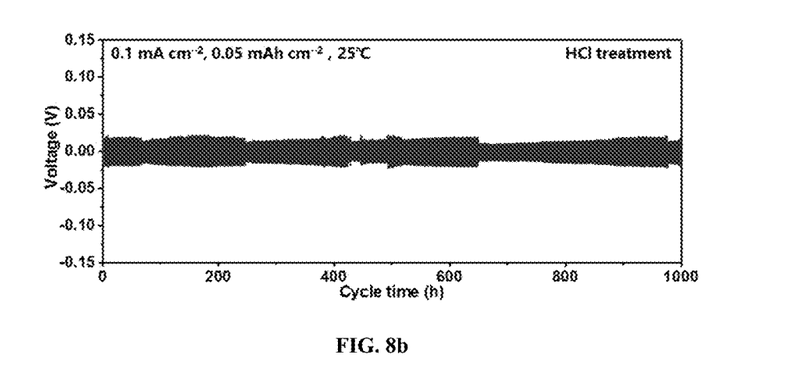
FIG. 8b shows the galvanostatic cycling performance of the solid-state lithium metal battery containing a modified solid electrolyte only treated with hydrochloric acid in Comparative Sample 2.

The modification layer only contains LiCl, and does not possess a three-dimensional crosslinking structure. The EIS of the assembled all-solid-state lithium symmetric cell was measured in a frequency range from 1 MHz to 0.1 Hz by potentiostatic method at 25° C. The result is shown in FIG. 8a. The interfacial impedance of the cell is also small, only 40 Ω cm². Meanwhile, the galvanostatic cycling test was also carried out at 25° C. at a current density of 0.1 mA cm$^{-2}$. The time of single charging or discharging is 30 minutes. After that, the cell was repeatedly cycled under the same conditions. The results are shown in FIG. 8b. the cell can operate without short circuit for 1000 hours. However, a voltage sag occurs within 100 hours, and there are some voltage fluctuations in the whole cycle.

Comparative Sample 3

The specific experimental processes are as follows:
a) The as-sintered garnet-type solid electrolyte $Li_{6.5}La_3Zr_{1.5}Ta_{0.5}O_{12}$ ceramic pellet is placed in air for 48 hours to form a pre-passivation layer;
b) Preparing high-ratio acid-salt solution: Hydrochloric acid and LiF are mixed with a molar ratio Cl:F of 20:1. Subsequently, a certain amount of water is added to control that the total mass fraction of the acid and salt is 8 wt %;
c) Acid-salt treatment: The solution obtained in step b) is slowly and evenly added to the solid electrolyte of step a) with the addition amount per unit area of 6.5 μL cm$^{-2}$ for 30 minutes staying at 60° C. The pellet is then washed with ethanol three times, and dried in an oven at 60° C. for 12 hours;
d) Lithium-molten process: The electrolyte pellet treated in step c) is transferred into a glovebox filled with argon (the content of water and oxygen is less than 0.1 ppm). Then lithium metal or lithium alloy is attached on one side of the pellet, and heated to 250° C. to ensure the good contact of lithium and the electrolyte;
e) All solid-state lithium symmetric cell is assembled after steps c) and d) are carried out on both sides of the solid electrolyte.

The modification layer here obtained contains mainly LiCl, and a small amount of LiF. Due to the high content of hydrochloric acid, it is difficult to form three-dimensional porous structure for the modification layer, which is basically dense. The interfacial impedance is large and the performance of long cycle is poor.

Comparative Sample 4

The specific experimental processes are as follows:
a) The as-sintered garnet-type solid electrolyte $Li_{6.5}La_3Zr_{1.5}Ta_{0.5}O_{12}$ ceramic pellet is placed in air for 48 hours to form a pre-passivation layer;
b) Preparing low-ratio acid-salt solution: Hydrochloric acid and LiF are mixed with a molar ratio Cl:F of 1:5. Subsequently, a certain amount of water is added to control that the total mass fraction of the acid and salt is 8 wt %;
c) Acid-salt treatment: The solution obtained in step b) is slowly and evenly added to the solid electrolyte of step a) with the addition amount per unit area of 6.5 μL cm$^{-2}$ for 30 minutes staying at 60° C. The pellet is then washed with ethanol three times, and dried in an oven at 60° C. for 12 hours;
d) Lithium-molten process: The electrolyte pellet treated in step c) is transferred into a glovebox filled with argon (the content of water and oxygen is less than 0.1 ppm). Then lithium metal or lithium alloy is attached on one side of the pellet, and heated to 250° C. to ensure the good contact of lithium and the electrolyte;
e) All solid-state lithium symmetric cell is assembled after steps c) and d) are carried out on both sides of the solid electrolyte.

The modification layer of solid electrolyte contains LiCl and LiF, but a certain amount of unexpected lithium carbonate remains on the surface. When melting lithium, the wettability of the interface is not good, which causes an uneven contact of the interface. Therefore, the cell has a large interfacial impedance and a poor cycle performance.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:
1. A modified garnet-type solid electrolyte, comprising:
   a garnet-type solid electrolyte;
   a modification layer, wherein the modification layer:
      is formed on at least one side of the garnet-type solid electrolyte, and
      possesses a three-dimensional crosslinking structure comprising at least one strongly acidic lithium salt and at least one weakly acidic lithium salt.
2. The modified garnet-type solid electrolyte of claim 1, wherein the strongly acidic lithium salt comprises at least one of lithium chloride, lithium perchlorate, lithium sulfate, or lithium nitrate.
3. The modified garnet-type solid electrolyte of claim 1, wherein the weakly acidic lithium salt comprises at least one of lithium fluoride, lithium acetate, lithium phosphate, or lithium silicate.
4. The modified garnet-type solid electrolyte of claim 1, wherein a molar ratio of the at least one strongly acidic lithium salt in the modification layer to the at least one weakly acidic lithium salt in the modification layer is in a range of 50:1 to 1:1.
5. The modified garnet-type solid electrolyte of claim 1, wherein the garnet-type solid electrolyte comprises at least one of:
   (i) $Li_{7-3a}La_3Zr_2L_aO_{12}$, with L=Al, Ga or Fe and $0 \leq a \leq 7/3$;
   (ii) $Li_7La_{3-b}Zr_2M_bO_{12}$, with M=Bi, Ca, or Y and $0 < b < 1$;
   (iii) $Li_{7-c}La_3(Zr_{2-c},N_c)O_{12}$, with N=In, Si, Ge, Sn, V, W, Te, Nb, or Ta and $0 \leq c \leq 2$;
   (iv) $Li_{7-x}La_3(Zr_{2-x}, M_x)O_{12}$, with M=In, Si, Ge, Sn, Sb, Sc, Ti, Hf, V, W, Te, Nb, Ta, Al, Ga, Fe, Bi, Y, Mg, Ca, or combinations thereof and $0 \leq x \leq 2$; and
   (v) $Li_{7-2d}La_3Zr_{2-d}N_dO_{12}$, with N=W or Mo and $0 \leq d \leq 2$, or combinations thereof.
6. The modified garnet-type solid electrolyte of claim 1, wherein the modification layer comprises a pore diameter ranging from 0.1 μm to 1 μm.
7. The modified garnet-type solid electrolyte of claim 1, wherein a thickness of the modification layer is in a range of 1 μm to 10 μm.

8. A method of forming a modified garnet-type solid electrolyte, comprising:
   exposing a garnet-type solid electrolyte in air;
   mixing solutions of strong acid and weakly acidic salt to form a mixed solution;
   chemically treating at least one side of the garnet-type solid electrolyte with the mixed solution; and
   forming a modification layer on the at least one side of the garnet-type solid electrolyte after the exposing the garnet-type solid electrolyte in air, wherein the modification layer comprises a three-dimensional crosslinking structure comprising at least one strongly acidic lithium salt and at least one weakly acidic lithium salt.

9. The method of claim 8, wherein the strong acid comprises at least one of hydrochloric acid, sulphuric acid, nitric acid, or perchloric acid.

10. The method of claim 8, wherein the weakly acidic salt comprises at least one of lithium fluoride, lithium carbonate, lithium acetate, or lithium phosphate.

11. The method of claim 8, wherein a molar concentration ratio of the strong acid to the weakly acidic salt is in a range of 1:1 to 20:1.

12. The method of claim 8, wherein a total mass fraction of the strong acid and weakly acidic salt in the mixed solution is in a range of 1 wt % to 50 wt %.

13. The method of claim 8, wherein an amount of the mixed solution added to the at least one side of the garnet-type solid electrolyte, per unit area, is in a range of 0.1 μL, $cm^{-2}$ to 50 μL $cm^{-2}$.

14. The method of claim 8, wherein the exposing the garnet-type solid electrolyte in air is conducted for a time in a range of 1 hour to 1000 hours.

15. The method of claim 8, wherein the mixing solutions of the strong acid and the weakly acidic salt is conducted in a solvent comprising at least one of water, ethanol, or isopropanol.

16. The method of claim 8, wherein the chemically treating the at least one side of the garnet-type solid electrolyte with the mixed solution is conducted for a time in a range of 10 minutes to 1000 minutes.

17. The method of claim 8, wherein the chemically treating the at least one side of the garnet-type solid electrolyte with the mixed solution is conducted at a temperature in a range of 25° C. to 300° C.

18. A solid-state lithium metal battery comprising the modified garnet-type solid electrolyte of claim 1.

* * * * *

UNITED STATES PATENT AND TRADEMARK OFFICE
CERTIFICATE OF CORRECTION

PATENT NO. : 11,777,139 B2
APPLICATION NO. : 17/101853
DATED : October 3, 2023
INVENTOR(S) : Jun Jin et al.

It is certified that error appears in the above-identified patent and that said Letters Patent is hereby corrected as shown below:

On the Title Page

In Column 1, under Prior Publication Data, Line 2, below "Mar. 17, 2022" insert item (30), -- Foreign Application Priority data Sep. 11, 2020 (CN) ........ 202010951937 -- as a new field entry.

In the Claims

In Column 12, Line 59, after "$0 \leq x \leq 2$;" delete "and".

Signed and Sealed this
Thirtieth Day of April, 2024

*Katherine Kelly Vidal*
*Director of the United States Patent and Trademark Office*